United States Patent
Plewnia

(10) Patent No.: US 11,919,491 B2
(45) Date of Patent: Mar. 5, 2024

(54) METHOD FOR OPERATING A BRAKE SYSTEM, COMPUTER PROGRAM PRODUCT, CONTROL CIRCUIT AND CONTROL UNIT

(71) Applicant: ZF Active Safety GmbH, Koblenz (DE)

(72) Inventor: Heinrich Plewnia, Niederhofen (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 17/870,441

(22) Filed: Jul. 21, 2022

(65) Prior Publication Data

US 2023/0033575 A1 Feb. 2, 2023

(30) Foreign Application Priority Data

Jul. 29, 2021 (DE) .......................... 102021119717.1

(51) Int. Cl.
*B60T 13/74* (2006.01)
*B60T 13/16* (2006.01)

(52) U.S. Cl.
CPC .......... *B60T 13/745* (2013.01); *B60T 13/162* (2013.01); *B60T 2270/414* (2013.01)

(58) Field of Classification Search
CPC ........ B60T 13/74; B60T 13/745; H02H 3/023
USPC .......................................................... 60/545
See application file for complete search history.

(56) References Cited

U.S. PATENT DOCUMENTS

| | | | | | |
|---|---|---|---|---|---|
| 3,837,442 | A | * | 9/1974 | Baermann | B60L 7/003 |
| | | | | | 188/165 |
| 2021/0126560 | A1 | * | 4/2021 | Yamamoto | H02P 6/24 |

FOREIGN PATENT DOCUMENTS

| | | | | | |
|---|---|---|---|---|---|
| CN | 112789203 | A | * | 5/2021 | .............. B60T 13/74 |
| DE | 102008037666 | A1 | * | 3/2009 | ........... B60T 13/665 |
| DE | 102013209527 | A1 | * | 11/2014 | ................ B60L 3/04 |
| DE | 102013209527 | A1 | | 11/2014 | |
| DE | 102015222352 | A1 | * | 5/2017 | |
| EP | 2379378 | B1 | | 1/2014 | |
| EP | 3350046 | B1 | | 10/2019 | |
| JP | 2014108656 | A | * | 6/2014 | |
| KR | 20160131439 | A | * | 11/2016 | |
| WO | WO-2020075322 | A1 | * | 4/2020 | ............. B60T 13/74 |
| WO | WO-2020195263 | A1 | * | 10/2020 | |

* cited by examiner

*Primary Examiner* — Thomas E Lazo
(74) *Attorney, Agent, or Firm* — Kristin L. Murphy

(57) ABSTRACT

A method for operating a brake system of a motor vehicle is disclosed. The brake system comprises a drive arrangement for applying and/or boosting a brake force, wherein the drive arrangement has an electric drive. The method comprises the step: short-circuiting the electric drive as soon as the electric drive has been disconnected from a supply source and/or a voltage drop and/or current drop has taken place. A computer program, control circuit and a control unit or system having multiple control units is also disclosed.

18 Claims, 2 Drawing Sheets

METHOD FOR OPERATING A BRAKE SYSTEM, COMPUTER PROGRAM PRODUCT, CONTROL CIRCUIT AND CONTROL UNIT

CROSS-REFERENCE TO RELATED APPLICATION

This application claims priority to German Patent Application No. 102021119717.1, filed Jul. 29, 2021, the disclosure of which is incorporated herein by reference in its entirety.

TECHNICAL FIELD

The disclosure relates to a method for operating a brake system of a motor vehicle, a computer program, a control circuit and a control unit and a system comprising multiple control units for a motor vehicle.

BACKGROUND

Vehicle brake systems often comprise electromechanical brake systems (EMB, EMB actuators), electromechanical brake boosters (electronic brake booster, EBB, EBB actuators) or integrated brake systems (IBC, IBC actuators). The energy or auxiliary energy is conventionally generated electrically in order to apply or boost a brake force. Electric motors and actuators are often used here. By way of example, electromechanical brake systems often serve as electronic parking brakes, in which a brake pad is pressed against the brake disc by an electric motor and actuator. In the case of an electromechanical brake booster, the pressure exerted on the master brake cylinder is supported or boosted, wherein the piston of the master brake cylinder is moved by the electric motor and a gear. Such an electromechanical brake booster is known for example from EP 3 350 046 B1 and a method for controlling a brake actuation is known from EP 2 379 378 B1.

When applying a brake or when building up pressure in a brake system with the aid of electric drives such as electric motors, a relatively high amount of energy is stored in the respective units. Such systems must usually be designed to be self-releasing. A consequence of this is that the stored energy is released immediately once the electric drive has been disconnected from a supply voltage. There is therefore a risk that the electric drive will move at a high speed towards its back stop, whereby it even becomes damaged or destroyed. In this case, a majority of the stored energy is converted into a rotational energy of the drive motor rotating with its moment of inertia and at its high rotational speed. Gears are also usually present, which rotate the electric motor in the reverse direction in a mechanically accelerated manner at a high rotational speed. It has been shown that the mechanical construction may not be stable enough to withstand this impulse or backwards impact. For example, the electric drive, gearwheels, the rack or the housing may be damaged or even destroyed. This may then result in a failure of the electric drive and the actuators and therefore the brake system.

SUMMARY

The disclosure is based on functionally improving a method mentioned at the outset. Moreover, the disclosure is based on an object of structurally and/or functionally improving a computer program mentioned at the outset, a control circuit mentioned at the outset and a control unit or control system mentioned at the outset.

A method may be and/or serve for operating a brake system of a motor vehicle. The brake system may be a motor vehicle brake system. The brake system may comprise a drive arrangement for applying and/or boosting a brake force. The drive arrangement may be designed to drive at least one actuating device which is designed to actuate a hydraulic pressure generator. The brake system may comprise the hydraulic pressure generator. The brake system may comprise the actuating device. The drive arrangement may be designed to build up a brake force, which acts on a brake disc of the brake system, by pressing the brake pad against a brake disc. The brake system may comprise at least one wheel brake. The drive arrangement may be part of the wheel brake. The wheel brake and/or the drive arrangement may be a parking brake device, for example an electric parking brake (EPB) or a part thereof. The drive arrangement and/or electric parking brake may be designed to continuously provide a brake force, if the vehicle is temporarily in a stationary state, for example in a parked state or for a hill start. The electric parking brake may be designed to hold and/or mechanically fix the drive arrangement and/or a wheel brake piston in a brake-force-generating position. Instead of the term "wheel", the term "tire" may be used above and/or below. The motor vehicle may be a car or a heavy goods vehicle. The brake system may have a functional unit. The functional unit may have a brake pedal which can be actuated by a driver of the vehicle. The functional unit may have the hydraulic pressure generator. The functional unit may have the drive arrangement.

The hydraulic pressure generator may be, for example operatively, such as mechanically and/or electrically, coupled to the brake pedal. The hydraulic pressure generator may be designed to build up a hydraulic pressure on the at least one wheel brake. The at least one wheel brake may be hydraulically actuable. The hydraulic pressure generator may be designed to build up a hydraulic pressure on multiple, for example two, three or four wheel brakes. The hydraulic pressure may be a hydraulic fluid pressure and/or brake pressure. The hydraulic pressure generator may comprise or be a brake cylinder. The brake cylinder may be a master brake cylinder, for example a tandem master brake cylinder. The brake cylinder may be operatively, for example mechanically and/or electrically, coupled to the brake pedal. The brake system and/or the hydraulic pressure generator may have a hydraulic fluid reservoir. The hydraulic pressure generator and/or the brake cylinder may have a piston, such as an input piston, master cylinder piston, master brake cylinder piston or master cylinder tandem piston. The brake pedal may be designed to mechanically actuate the brake cylinder and/or piston. The piston may be a tandem piston. The piston may be operatively, for example mechanically and/or electrically, coupled to the brake pedal. The brake cylinder of the hydraulic pressure generator may have a pressure chamber. The piston may be mounted in the pressure chamber. Via a displacement of the piston in the pressure chamber of the brake cylinder, the hydraulic pressure in the pressure chamber and/or the pressure in fluid lines which are in communication, or can be brought into communication, with the pressure chamber may be altered. The pressure chamber may be or become fluidically coupled to one or more wheel brakes via the fluid lines. The hydraulic pressure in the pressure chamber may be transferred to the one or more wheel brakes as a brake pressure.

The drive arrangement may be, for example, operatively, such as mechanically and/or electrically, coupled to the brake pedal. The drive arrangement may comprise an actuating element, which is designed to maintain a brake force acting on a brake disc of a wheel brake in that the actuating element presses a brake pad and/or friction pad against the brake disc. The drive arrangement and/or electric parking brake may have a corresponding brake shoe. The drive arrangement may be designed to actuate the brake pad and/or friction pad or the brake shoe in such a way that a tensioning force is exerted against the brake disc and/or a parking state is brought about thereby. The brake disc may be non-rotatably connected to an axle of the motor vehicle and/or a vehicle wheel. The brake shoe may press against the brake disc via at least one brake pad fastened thereto.

The drive arrangement may have an electric drive. The electric drive may be designed to apply and/or boost a brake force. The drive arrangement and/or the electric drive thereof may be designed to be self-releasing. The electric drive may be and/or comprise at least one electric motor and/or at least one electric synchronous machine, such as a permanent-magnet synchronous machine (PMSM). The electric motor may be a brushless electric motor. The electric motor may be a direct current motor. For example, the electric motor may be a brushless direct current motor (BLDC motor). The electric drive may have two or three electrical connections. The electric drive may have two or three phases. Each of the electrical connections of the electric drive may be associated with one phase of the electric drive and/or a supply source, such as a voltage source and/or current source and/or supply voltage and/or supply current. A first electrical connection of the electric drive may be associated with a first phase. A second electrical connection of the electric drive may be associated with a second phase. A third electrical connection of the electric drive may be associated with a third phase. The electrical connections of the electric drive may be supply connections and/or voltage connections and/or current connections.

The drive arrangement may have at least one gear. The gear may have multiple gearwheels. The gear may be designed to couple the electric drive to the at least one actuating device. The gear may be designed to couple the electric drive to the actuating element. The gear may be or become coupled to the at least one actuating device or to the actuating element. The at least one actuating device may be or become indirectly or directly coupled to the hydraulic pressure generator, for example to the piston of the hydraulic pressure generator. The drive arrangement may be designed to displace or to move the piston, for example upon manual and/or automatic activation of a braking procedure and/or vehicle-stopping function and/or during the braking operation of the motor vehicle. The piston which can be displaced or moved by the drive arrangement may be a master cylinder piston, such as a master brake cylinder piston, or a piston which is indirectly or directly coupled or couplable to the master cylinder piston. The indirect action can take place for example in a hydraulic manner in that the gear acts on a plunger arrangement whereof the output may be hydraulically coupled to an input of the brake cylinder. The drive arrangement may be an electromechanical brake booster (electronic brake booster, EBB, EBB actuator) or a part thereof. The drive arrangement may be designed to actuate the brake pad and/or friction pad or brake shoe by the electric drive and/or the actuating element in such a way that a tensioning force is exerted against the brake disc and/or a parking state is brought about thereby. The drive arrangement may be an electromechanical brake actuator and/or an electromechanical brake system (EMB, EMB actuator) or a part thereof.

The drive arrangement may be an integrated brake system (IBS) or a part thereof. The drive arrangement may have an actuator and an electric motor as an electric drive. The actuating element and the electric drive may be an actuator or may form the actuator. The actuating device and the electric drive may be an actuator or may form the actuator. The drive arrangement may be an electronic brake actuator.

The brake system may have a wheel-brake-pressure regulating device. The wheel-brake-pressure regulating device may be designed to carry out regulating interventions on the at least one wheel brake of the motor vehicle. The wheel-brake-pressure regulating device may be designed to regulate the hydraulic pressure and/or brake pressure on one or more wheel brakes via a brief successive sequence of pressure-maintaining, pressure-build-up and/or pressure-decreasing phases, for example in order to prevent a locking or spinning of one or more wheels of the vehicle. The brake system and/or the wheel-brake-pressure regulating device may have one or more valve arrangements/valves and/or pump devices/pumps. The wheel-brake-pressure regulating device may have a hydraulic fluid reservoir.

The brake system may comprise a vehicle-dynamics regulating system, for example an anti-lock brake system (ABS) and/or an electronic stability program (ESP or ESC, electronic stability control). The vehicle-dynamics regulating system may comprise one or more functions, such as a anti-slip regulation (ASR), an anti-lock brake system (ABS) and/or an electronic brake force distribution (EBV). The brake system may comprise a traction control system (TC). The brake system may be fitted as a brake-by-wire system (BBW system) and/or designed as such. The drive arrangement may be part of the brake-by-wire system. In the case of the BBW system, the actual brake force, such as the service brake force, may be generated by means of the drive arrangement. The brake pedal in the BBW system may be mechanically uncoupled from the piston, for example. The mechanical uncoupling may be overridden by a push-through device (PT system), for example in the event of an error of the BBW system. The brake system may be fitted with an electric brake boost system (EBB system) and/or designed as such. The drive arrangement and/or the hydraulic pressure generator may be part of the electric brake boost system. In the case of the EBB system, the force applied to the brake pedal by the driver may be boosted by the drive arrangement. The wheel-brake-pressure regulating device may be and/or comprise a vehicle safety system and/or vehicle-dynamics regulating system, for example an ABS and/or TC and/or ESC regulating device.

The method may comprise the step: monitoring the drive arrangement and/or the electric drive to detect whether the electric drive has been disconnected from a supply source and/or a voltage drop and/or current drop has taken place. The disconnection from the supply source and/or the voltage drop and/or the current drop may take place suddenly. A, for example current, voltage value and/or current value, which is applied or present at the electric drive or the electrical connections thereof, may be monitored. A, for example current, speed and/or acceleration of the electric drive may be monitored. The monitoring may take place by means of a monitoring device, for example a so-called watchdog device. The monitoring device may have one or more sensors. The monitoring device may be part of the brake system and/or a control unit or control unit system.

The method may comprise the step: detecting that the electric drive of the drive arrangement has been disconnected from a supply source and/or a voltage drop and/or current drop has taken place. The detection procedure may be or comprise a recording procedure. A current state, such as a voltage-free state and/or current-free state and/or operating state, of the electric drive of the drive arrangement may be recorded and/or detected. For example, it may be detected if a voltage drop and/or current drop below a predefined threshold value, such as a voltage value and/or current value, has taken place. The current voltage value and/or current value may be recorded. The current voltage value and/or current value may be compared with the predefined threshold value. A current voltage value and/or current value may be understood to mean the voltage value and/or current value which is currently applied or present at the electric drive or the electrical connections thereof. A current speed and/or current acceleration of the electric drive may be recorded and/or detected.

The method may comprise the step: short-circuiting the electric drive of the drive arrangement as soon as the electric drive has been disconnected from a supply source and/or a voltage drop and/or current drop has taken place. The method may comprise the step: short-circuiting the electric drive of the drive arrangement as soon as it has been detected that the electric drive has been disconnected from a supply source and/or a voltage drop and/or current drop has taken place. The method may comprise the step: short-circuiting the electric drive of the drive arrangement as soon as a voltage drop and/or current drop below a predefined threshold value, such as a voltage value and/or current value, has taken place. The method may comprise the step: short-circuiting the electric drive of the drive arrangement as soon as it has been detected that a voltage drop and/or current drop below a predefined threshold value, such as a voltage value and/or current value, has taken place.

The short-circuiting may take place directly/immediately. The electric drive may be short-circuited as soon as the electric drive of the drive arrangement has been disconnected from a supply voltage and/or from a supply current and/or from a voltage source and/or from a current source and/or such a disconnection has been detected.

The disconnection from the supply source, such as a voltage source and/or current source and/or supply voltage and/or supply current, may be sudden. The supply source may be a battery or accumulator. It may be a supply source of the electric drive of the drive arrangement. The supply source may be electrically connected to the electric drive, in particular to the electrical connections thereof. The voltage drop and/or current drop may be sudden.

Two or three phases and/or two or three electrical connections of the electric drive may be short-circuited. For example, the first and second electrical connection of the electric drive and/or the first and second phase may be short-circuited. The first, second and third electrical connection of the electric drive and/or the first, second and third phase may be short-circuited. The short-circuiting may take place in the voltage-free and/or current-free state of the electric drive. The electric drive may be decelerated for example via the short-circuiting. For example, a movement, such as a backwards movement and/or a movement in the backwards direction may be decelerated. The deceleration may take place fully, such as up to a standstill, or at least partially. The deceleration may take place to a point below a critical speed or acceleration. The current speed and/or current acceleration may be compared to a speed threshold value or acceleration threshold value. The critical speed or acceleration may be or become defined by the speed threshold value or acceleration threshold value.

A computer program product may comprise program code in order to execute the method described above and/or below, in particular for operating a brake system, when the computer program product is executed on a processor. A computer program product may prompt a device, such as a, for example electronic, control and/or a control and/or computing module/unit, a control system, a driver assistance system, a brake system, such as a vehicle brake system, a processor or a computer, to execute the method described above and/or below, in particular for operating a brake system. To this end, the computer program may have corresponding data sets and/or program code and/or the computer program and/or a storage medium for storing the data sets or the program A control circuit may be developed and/or intended for use in a motor vehicle. The control circuit may be developed and/or intended to execute the method described above and/or below, in particular for operating a brake system. The brake system and/or drive arrangement may comprise the control circuit. The control circuit may be a protective circuit.

The control circuit may comprise a first line. The first line may be a first electrical line. The first line may be connected to a first phase and/or to a first electrical connection of an electric drive of a drive arrangement of a brake system of a motor vehicle. The drive arrangement and/or the electric drive thereof may be designed to apply and/or boost a brake force.

The control circuit may comprise a second line. The second line may be a second electrical line. The second line may be connected to a second phase and/or to a second electrical connection of the electric drive of the drive arrangement.

The brake system and/or the drive arrangement and/or the electric drive and/or the electrical connection or the electrical connections may be designed as described above and/or below.

The control circuit may comprise a controllable switch. The controllable switch may be an electronic switch. For example, the controllable switch may have at least one relay (e.g. mechanical relay and/or semiconductor relay), transistor, FET, BJT, MOSFET, MISFET or JFET or be formed thereby. The controllable switch may be designed to disconnect the first line and the second line in an open state and to connect them to one another, for example electrically, in a closed state.

The control circuit may comprise a third line. The third line may be a second electrical line. The third line may be connected to a third phase and/or to a third electrical connection of the electric drive of the drive arrangement. The controllable switch may be designed to disconnect the first line, the second line and the third line in an open state and to connect them to one another, for example electrically, in a closed state.

The control circuit may comprise a switch control module. The switch control module may be developed and/or intended to control the switching states of the controllable switch, wherein the switch is opened in a first control state of the switch and is closed in a second control state of the switch. The switch control module may furthermore be developed and/or intended to switch from the first control state to the second control state as soon as the electric drive has been disconnected from a supply source and/or a voltage drop and/or current drop has taken place and/or the disconnection or drop has been detected.

A control unit or a system comprising multiple control units may be used in a motor vehicle. The brake system and/or drive arrangement may comprise the control unit or the system comprising multiple control units. The control unit or the system may be developed and/or intended for use in a motor vehicle. The control unit or the system may have an electronic control. The control unit or the system may be or comprise an electronic control unit (ECU). Multiple control units may be provided. The multiple control units may be connected to one another and/or exchange data with one another via a bus system, for example a controller area network (CAN). The electronic control and/or the control unit or system may have a microcomputer and/or processor. The control unit or system may comprise one or more sensors. The control unit or system may comprise the computer program product described above and/or below. The control unit or the system may have a memory. The computer program product may be stored in the memory. The control unit or system may be designed to carry out the method described above and/or below. The control unit or system may comprise the control circuit described above and/or below.

In other words, an electric drive, such as an electric motor, may be decelerated in the event of a sudden voltage drop and/or upon a disconnection of the voltage supply. Two or three phases of the electric drive, such as a drive motor, may be short-circuited in the voltage-free state, for example as soon as the electric drive has been disconnected from the supply voltage and/or a voltage drop has taken place. A corresponding protective circuit, for example on the control unit, such as an ECU, may be realised, for example by means of mechanical relays and/or semiconductor relays, such as MOSFETs. The electric drive may be part of an electromechanical brake system (EMB), an electromechanical brake booster (EBB) or an integrated brake system (IBC). The electric drive and/or these systems may be designed to be self-releasing. The arrangements of the disclosure provides that, a simple, safe and/or cost-effective protection may be provided, for example against damage and/or destruction of an electric brake or brake unit or the drive arrangement and the electric drive thereof, such as an electric motor. An uncontrolled backwards striking and/or rapid backwards movement against the back stop may be prevented. Damage or destruction of the drive arrangement and the electric drive thereof and/or the electromechanical brake (EMB), the electromechanical brake booster (EBB) or the integrated brake system (IBC) or parts thereof may be prevented. The safety may be increased, even in the event of a sudden system failure or reset. The reliability may be improved.

BRIEF DESCRIPTION OF DRAWINGS

Exemplary arrangements of the disclosure are described in more detail below with reference to figures in which, in a schematic representation and by way of example.

DETAILED DESCRIPTION

Figure 1:
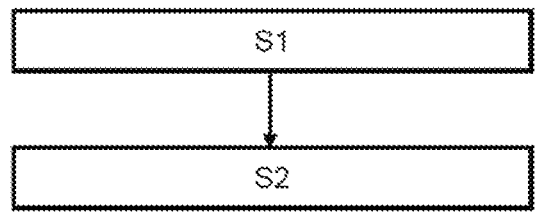
FIG. 1 shows a flow chart of a method for operating a brake system of a motor vehicle.

FIG. 1 shows, in a schematic representation, a flow chart of a method for operating a brake system of a motor vehicle.

The brake system has a drive arrangement for applying and/or boosting a brake force. The drive arrangement has an electric drive, such as an electric motor, and a gear. The electric drive may be designed to apply and/or boost the brake force.

In a step S1, it is detected that the electric drive has been disconnected from a supply source and/or a sudden voltage drop has taken place. The supply source may be the supply voltage and/or the supply current of the electric drive.

In a step S2, the electric drive is short-circuited as soon as the electric drive has been disconnected from the supply source and/or the voltage drop has taken place or this has been detected. In this case, the two or three phases and/or the two or three electrical connections of the electric drive are short-circuited. This takes place for example in the voltage-free and/or current-free state of the electric drive.

Damage or destruction as a result of a sudden movement in the reverse direction and backwards impact can thus be prevented.

Figure 2:
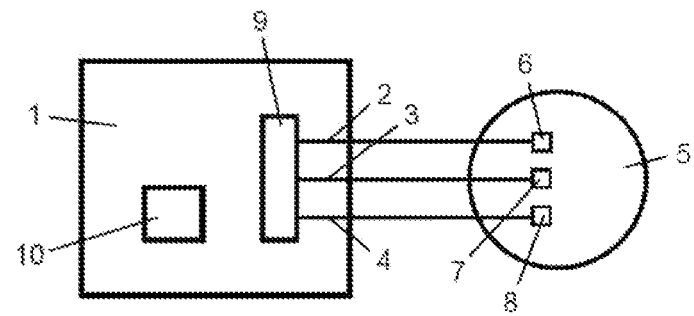
FIG. 2 shows a control circuit.

FIG. 2 shows, in a schematic representation, a control unit 1, which is developed and intended for use in a motor vehicle. The control circuit 1 may be developed and/or intended to execute the method described above and/or below.

The control circuit 1 has a first line 2, a second line 3 and a third line 4. An electric drive 5 of a drive arrangement of a brake system of a motor vehicle has a first electrical connection 6 associated with a first phase, a second electrical connection 7 associated with a second phase and a third electrical connection 8 associated with a third phase. The drive arrangement and/or the electric drive 5 thereof is designed to apply and/or boost a brake force.

The first line 2 is connected to the first phase and to the first electrical connection 6 of the electric drive 5 of the drive arrangement. The second line 3 is connected to the second phase and to the second electrical connection 7 of the electric drive 5 of the drive arrangement. The third line 4 is connected to the third phase and to the third electrical connection 8 of the electric drive 5 of the drive arrangement.

The control circuit 1 furthermore has a controllable switch 9. The controllable switch 9 is designed to disconnect the first line 2, the second line 3 and the third line 4 in an open state and to electrically connect them to one another in a closed state.

The control circuit 1 furthermore has a switch control module 10. The switch control module 10 is developed and intended to control the switching states of the controllable switch 9, wherein the switch 9 is opened in a first control state and the switch 9 is closed in a second control state. The switch control module 10 is furthermore developed and intended to switch from the first control state to the second control state as soon as the electric drive 5 has been disconnected from a supply source and/or a sudden voltage drop has taken place and/or this has been detected.

Moreover, please refer additionally to FIG. 1 in particular and the associated description.

Figure 3:
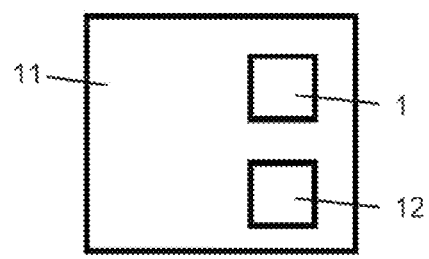
FIG. 3 shows a control unit with a control circuit according to FIG. 2.

FIG. 3 shows, in a schematic representation, a control unit 11, which is developed and intended for use in a motor vehicle. The control unit 11 has a processor 12 and a computer program. The computer program comprises a program code in order to carry out the method described above and/or below when the computer program is executed on the processor 12. The control unit 11 furthermore has the control circuit 1.

Moreover, please refer additionally to FIGS. 1 and 2 in particular and the associated description.

Figure 4:
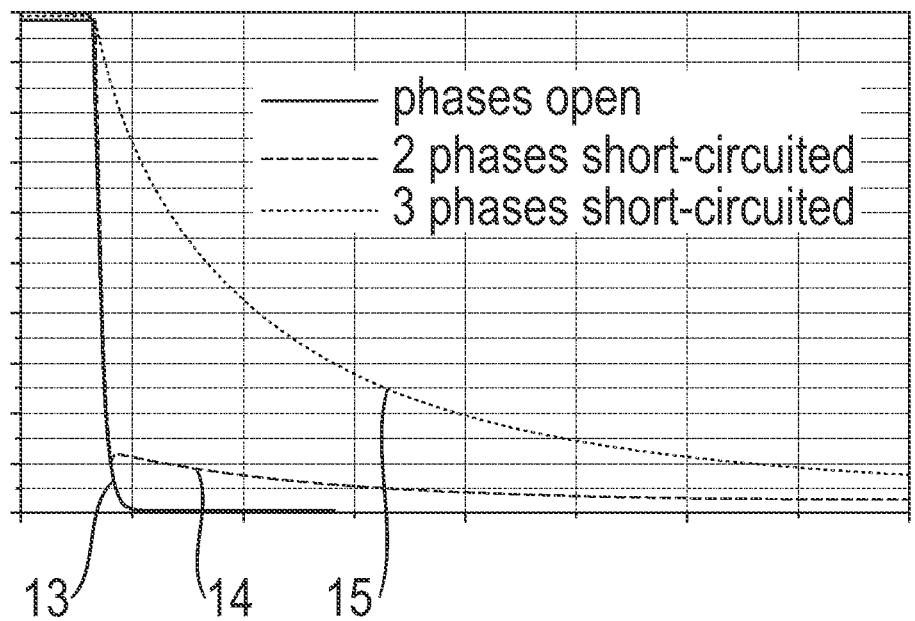
FIG. 4 shows a graph relating to the pressure drop in the event of a sudden voltage drop.

FIG. 4 shows, in a schematic representation, a graph relating to the pressure drop of an integrated brake system (IBC system) in the event of a sudden voltage drop.

This shows a first curve 13 of the pressure drop, in which all phases of the electric drive 5 are open, i.e. are not short-circuited, a second curve 14 of the pressure drop, in which two phases of the electric drive 5 have been short-circuited, and a third curve 15 of the pressure drop, in which three phases of the electric drive 5 have been short-circuited.

Whilst, in the open phases, the pressure drop takes place very quickly and the electric drive 5 moves sharply against the rear stop, in the event of a short-circuit of only two phases of the electric drive 5 upon a sudden shut-down or disconnection from the supply source and/or a voltage drop, effective deceleration of the electric drive 5 takes place well before the end stop is reached.

Moreover, please refer additionally to FIGS. 1 to 3 in particular and the associated description.

The word "may" refers in particular to optional features of the invention. Consequently, there are also developments and/or exemplary arrangements of the disclosure which additionally or alternatively have the respective feature or the respective features.

Isolated features may also be extracted as required from the feature combinations disclosed in the present case and, by eliminating a structural and/or functional connection which is possibly present between the features, may be used in combination with other features to define the subject matter of a claim. The sequence and/or number of all steps of the method may be varied.

The invention claimed is:

1. A method for operating a brake system of a motor vehicle, wherein the brake system comprises a drive arrangement for applying and/or boosting a brake force, wherein the drive arrangement has an electric drive, wherein the method comprises the step:
    short-circuiting the electric drive as soon as the electric drive has been disconnected from a supply voltage and/or a supply current.

2. The method according to claim 1, wherein two or three phases and/or two or three electrical connections of the electric drive may be short-circuited.

3. The method according to claim 1, wherein the short-circuiting takes place in the voltage-free and/or current-free state of the electric drive.

4. The method according to claim 1, wherein the electric drive is decelerated, by the short-circuiting.

5. The method according to claim 1, wherein the drive arrangement is designed to be self-releasing and/or the electric drive is an electric motor.

6. The method according to claim 1, wherein the drive arrangement is an electromechanical brake system, an electromechanical brake booster or an integrated brake system or is a part thereof.

7. A computer program, comprising a program code to carry out a method according to claim 1, when the computer program is executed on a processor.

8. A control unit or system comprising multiple control units for a motor vehicle, comprising at least one processor and a computer program product according to claim 7.

9. The control unit or system comprising multiple control units for a motor vehicle of claim 8, further comprising a control circuit that comprises:
    a first line, which is connected to a first phase and/or to a first electrical connection of an electric drive of a drive arrangement of a brake system of a motor vehicle, wherein the drive arrangement is designed to apply and/or boost a brake force;
    a second line, which is connected to a second phase and/or to a second electrical connection of the electric drive of the drive arrangement; and
    a controllable switch, which is designed to disconnect the first line and the second line in an open state and to connect them to one another in a closed state.

10. The method according to claim 1, wherein two or three phases and/or two or three electrical connections of the electric drive may be short-circuited.

11. The method according to claim 10, wherein two or three phases and/or two or three electrical connections of the electric drive may be short-circuited.

12. The method according to claim 11, wherein the short-circuiting takes place in the voltage-free and/or current-free state of the electric drive.

13. The method according to claim 12, wherein the electric drive is decelerated, by the short-circuiting.

14. The method according to claim 13, wherein the drive arrangement is designed to be self-releasing and/or the electric drive is an electric motor.

15. The method according to claim 13, wherein the drive arrangement is an electromechanical brake system, an electromechanical brake booster or an integrated brake system or is a part thereof.

16. A control circuit (1), which is developed and intended for use in a motor vehicle, comprising:
    a first line, which is connected to a first phase and/or to a first electrical connection of an electric drive of a drive arrangement of a brake system of a motor vehicle, wherein the drive arrangement is designed to apply and/or boost a brake force;
    a second line, which is connected to a second phase and/or to a second electrical connection of the electric drive of the drive arrangement;
    a controllable switch, which is designed to disconnect the first line and the second line in an open state and to connect them to one another in a closed state; and
    a switch control module, which is configured to control switching states of the controllable switch, wherein the switch is opened in a first control state and the switch-is closed in a second control state, wherein the switch control module is also configured to switch from the first control state to the second control state as soon as the electric drive has been disconnected from a supply source and/or a voltage drop and/or current drop has taken place.

17. A method for operating a brake system of a motor vehicle, wherein the brake system comprises a drive arrangement for applying and/or boosting a brake force, wherein the drive arrangement has an electric drive, wherein the method comprises the step:
    short-circuiting the electric drive as soon as the electric drive has been disconnected from a supply source and/or a voltage drop and/or current drop has taken place; wherein the short-circuiting takes place in the voltage-free and/or current-free state of the electric drive.

18. A control circuit, which is developed and intended for use in a motor vehicle, comprising:
    a first line, which is connected to a first phase and/or to a first electrical connection of an electric drive of a drive arrangement of a brake system of a motor vehicle, wherein the drive arrangement is designed to apply and/or boost a brake force;
    a second line, which is connected to a second phase and/or to a second electrical connection of the electric drive of the drive arrangement;

a third line, which is connected to a third phase and/or to a third electrical connection of the electric drive of the drive arrangement;

a controllable switch, which is designed to disconnect the first line, the second line, and the third line in an open state and to connect them to one another in a closed state; and a switch control module, which is developed and intended to control the switching states of the controllable switch, wherein the switch is opened in a first control state and the switch is closed in a second control state, wherein the switch control module is furthermore developed and intended to switch from the first control state to the second control state as soon as the electric drive has been disconnected from a supply source and/or a voltage drop and/or current drop has taken place.

* * * * *